(12) United States Patent
Vasko et al.

(10) Patent No.: US 12,479,065 B2
(45) Date of Patent: *Nov. 25, 2025

(54) CLOSED LOOP CONTROL SYSTEM FOR BLADE SHARPENING

(71) Applicant: Kimberly-Clark Worldwide, Inc., Neenah, WI (US)

(72) Inventors: Rudolf P. Vasko, Kennett Square, PA (US); Maxim Mironau, Feasterville, PA (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 460 days.

This patent is subject to a terminal disclaimer.

(21) Appl. No.: 17/800,263

(22) PCT Filed: Feb. 1, 2021

(86) PCT No.: PCT/US2021/016049
§ 371 (c)(1),
(2) Date: Aug. 17, 2022

(87) PCT Pub. No.: WO2021/188216
PCT Pub. Date: Sep. 23, 2021

(65) Prior Publication Data
US 2023/0075538 A1    Mar. 9, 2023

Related U.S. Application Data

(63) Continuation of application No. 16/820,857, filed on Mar. 17, 2020, now Pat. No. 11,752,591.

(51) Int. Cl.
B24B 49/00 (2012.01)
B24B 3/46 (2006.01)
B24B 49/16 (2006.01)

(52) U.S. Cl.
CPC .............. B24B 49/006 (2013.01); B24B 3/46 (2013.01); B24B 49/16 (2013.01)

(58) Field of Classification Search
CPC .. B24B 3/46; B24B 3/36; B24B 3/363; B24B 3/368; B24B 3/38; B24B 3/466;
(Continued)

(56) References Cited

U.S. PATENT DOCUMENTS

| 4,555,873 A | 12/1985 | Smith |
| 5,152,105 A | 10/1992 | Belvederi |

(Continued)

FOREIGN PATENT DOCUMENTS

| EP | 2878413 A1 | 6/2015 |
| EP | 2921256 B1 | 12/2018 |

(Continued)

OTHER PUBLICATIONS

Wikipedia, Rotary Encoder, https://web.archive.org/web/20191227075718/https://en.wikipedia.org/wiki/Rotary_encoder (Year: 2019).*

(Continued)

*Primary Examiner* — Robert F Neibaur
(74) *Attorney, Agent, or Firm* — Armstrong Teasdale LLP

(57) ABSTRACT

A controller is provided for use in controlling a blade sharpening system that includes at least one grinding wheel operable to sharpen the blade. The controller includes a memory device, and a processor communicatively coupled to the memory device. The processor is configured to receive signals from at least one sensor, the at least one sensor operable to monitor rotation of the at least one grinding wheel. The processor is further configured to adjust a position of the at least one grinding wheel relative to the blade based on the received signals.

12 Claims, 6 Drawing Sheets

(58) Field of Classification Search
CPC ........ B23Q 15/14; B26D 5/06; G05B 19/404; G05B 19/402; G05B 19/401
USPC .................. 451/5, 9, 10, 349, 383, 371, 203
See application file for complete search history.

(56) References Cited

U.S. PATENT DOCUMENTS

| | | | |
|---|---|---|---|
| 6,224,468 | B1 | 5/2001 | Blume et al. |
| 6,390,888 | B1* | 5/2002 | Amano ................... B24B 27/04 451/24 |
| 6,863,600 | B2 | 3/2005 | Friel, Sr. |
| 7,517,275 | B2 | 4/2009 | Friel, Sr. et al. |
| 8,512,103 | B2 | 8/2013 | Dovel et al. |
| 9,321,184 | B2* | 4/2016 | Baker ..................... B24D 13/14 |
| 10,272,535 | B1* | 4/2019 | Lyons ..................... B24B 49/12 |
| 10,300,574 | B2 | 5/2019 | Layton, Jr. et al. |
| 2006/0000312 | A1 | 1/2006 | Chiocchetti et al. |
| 2006/0011015 | A1 | 1/2006 | Chiocchetti et al. |
| 2012/0184186 | A1 | 7/2012 | Graham, Jr. et al. |
| 2016/0236369 | A1 | 8/2016 | Baker |
| 2017/0106460 | A1 | 4/2017 | Belzile et al. |
| 2020/0246933 | A1* | 8/2020 | Fowler ................... B24B 49/12 |

FOREIGN PATENT DOCUMENTS

| | | |
|---|---|---|
| JP | H06262500 A | 9/1994 |
| JP | H07251351 A | 10/1995 |
| JP | 2000263439 A | 9/2000 |
| JP | 2013066979 A | 4/2013 |
| WO | 2019016667 A1 | 1/2019 |

OTHER PUBLICATIONS

Written Opinion for Brazil Patent Application No. BR112022018061 dated Apr. 15, 2024; 6 pp.
PCT International Search Report and Written Opinion for Patent Application PCT/US2021/016049 mailed May 31, 2021; 10 pp.
Preliminary Report issued in International Application No. PCT/US2021/016049 mailed on Mar. 16, 2022; 7 pp.

* cited by examiner

CLOSED LOOP CONTROL SYSTEM FOR BLADE SHARPENING

CROSS REFERENCE TO RELATED APPLICATION

This application claims priority to U.S. patent application Ser. No. 16/820,857 filed on Mar. 17, 2020 and entitled CLOSED LOOP CONTROL SYSTEM FOR BLADE SHARPENING. The entirety of that application is hereby incorporated by reference in its entirety.

BACKGROUND

The present disclosure relates generally to blade sharpening systems, and more particularly to closed loop control systems for dynamically adjusting components of a blade sharpening system to improve sharpening.

At least some known blade sharpening systems include a pair of grinding wheels for sharpening a rotating blade. To sharpen the blade, each grinding wheel is advanced towards the rotating blade until an abrasive surface of the grinding wheel contacts the blade. The abrasive surface wears away the surface of the blade, sharpening the blade in the process.

To keep the blade sharp, it may be desirable to adjust a position of each grinding wheel relative to the blade during the sharpening process. For example, to counteract the grinding wheel wearing away the surface of the blade, it may be advantageous to continue to advance the grinding wheel towards the blade over time. However, in at least some known blade sharpening systems, the position of the grinding wheel relative to the blade cannot be accurately monitored and/or adjusted during the sharpening process.

At least some blade sharpening systems do enable adjusting a position of the grinding wheel during processing. For example, in at least some known systems, the grinding wheel is advanced towards the blade at a constant rate and/or when the system detects that a predetermined amount of the blade has been depleted. However, such systems may not account for uneven wear of the blade, and may not accurately monitor the sharpening process effectively.

There is a need, therefore, for an improved closed loop control system for a blade sharpening system that dynamically adjusts grinding wheel positions to improve blade sharpening.

SUMMARY

In one aspect, a controller is provided for use in controlling a blade sharpening system that includes at least one grinding wheel operable to sharpen the blade. The controller includes a memory device, and a processor communicatively coupled to the memory device. The processor is configured to receive signals from at least one sensor, the at least one sensor operable to monitor rotation of the at least one grinding wheel. The processor is further configured to adjust a position of the at least one grinding wheel relative to the blade based on the received signals.

In another aspect, a control system is provided for a blade sharpening system that includes at least one grinding wheel operable to sharpen the blade. The control system includes at least one sensor operable to monitor rotation of the at least one grinding wheel, and a controller communicatively coupled to the at least one sensor. The controller is configured to receive signals from the at least one sensor. The controller is further configured to adjust a position of the at least one grinding wheel relative to the blade based on the received signals.

In yet another aspect, a method is provided for controlling a blade sharpening system that includes at least one grinding wheel operable to sharpen the blade. The method includes receiving, at a controller, signals from at least one sensor, the at least one sensor operable to monitor rotation of the at least one grinding wheel. The method further includes adjusting a position of the at least one grinding wheel relative to the blade based on the received signals.

BRIEF DESCRIPTION OF THE DRAWINGS

Corresponding reference characters indicate corresponding parts throughout the several views of the drawings.

DETAILED DESCRIPTION OF THE DRAWINGS

According to some aspects of the disclosure, a closed-loop control system for use with a blade sharpening system is provided. The control system receives signals from a sensor operable to monitor rotation of a grinding wheel. The control system adjusts a position of the grinding wheel relative to the blade based on the received signals. By dynamically adjusting the position of the grinding wheel based on the sensor signals, the control provides a closed loop feedback system that improves sharpening of the blade, and provides other advantages over at least some known blade sharpening systems.

These features will become more apparent with reference to the accompanying drawings.

Figure 1:
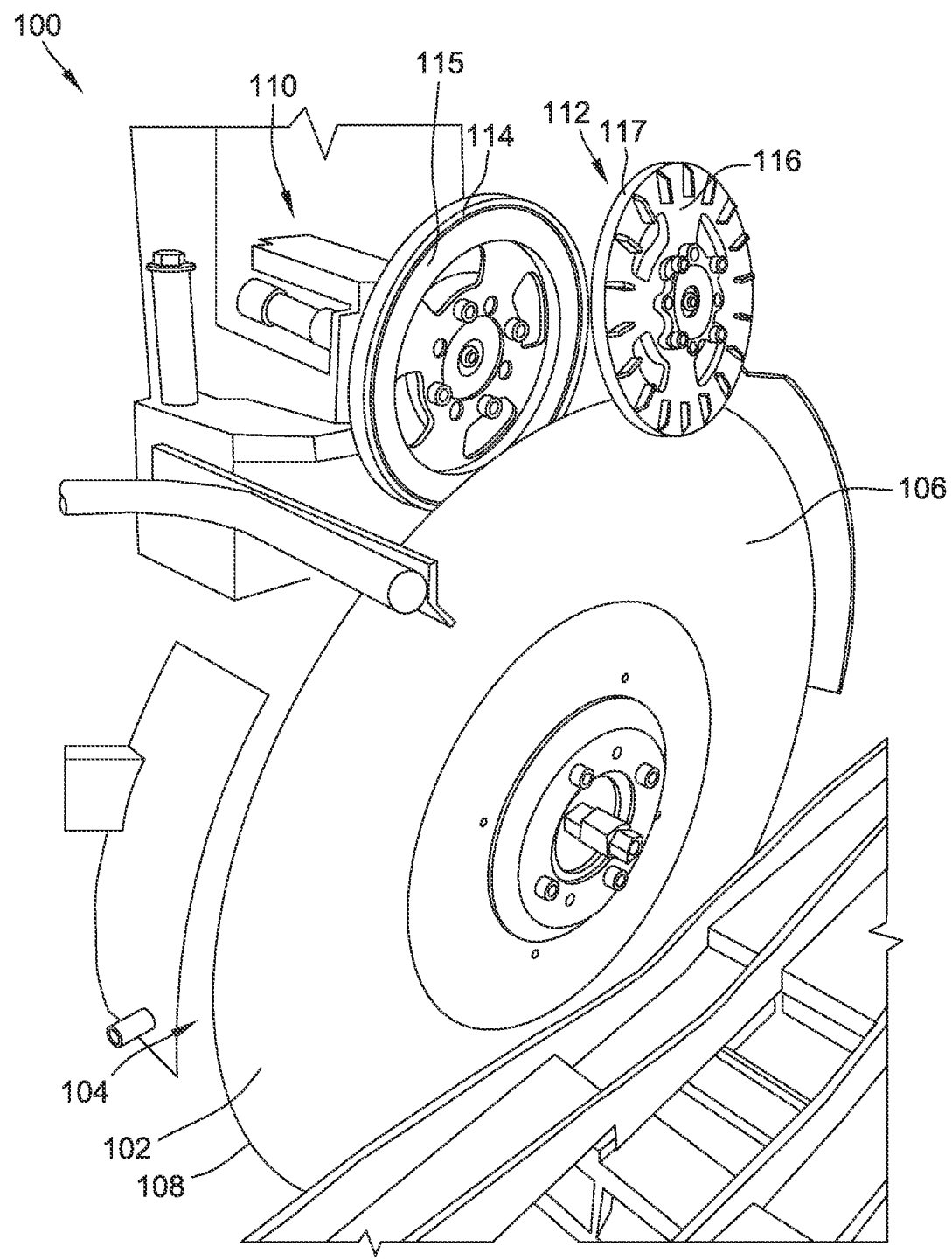
FIG. 1 is a perspective view of a blade sharpening system according to one embodiment of the present disclosure.

FIG. 1 illustrates one suitable embodiment of a blade sharpening system, indicated generally at 100, for sharpening a blade 102. The blade 102 is used to cut an article. The blade 102 may be used in various applications, and articles cut by the blade 102 may include, for example, fabrics, textiles, logs, etc. The blade 102 defines a first surface 104 and an opposite second surface 106. The first surface 104 and the second surface 106 meet at an outer circumference of the blade 102 to define a blade tip 108.

As shown in FIG. 1, the blade sharpening system 100 comprises a first grinding apparatus 110 and a second grinding apparatus 112. The first grinding apparatus 110 comprises a first grinding wheel 114 operable to sharpen the blade tip 108. Specifically, the first grinding wheel 114 comprises a first abrasive surface 115 (e.g., sandstone) operable to grind against the first surface 104 of the blade 102 proximate the blade tip 108 to sharpen the blade 102 at and adjacent to the blade tip 108. Similarly, the second grinding apparatus 112 comprises a second grinding wheel 116 operable to sharpen the blade 102. Specifically, the second grinding wheel 116 comprises a second abrasive surface 117 (e.g., sandstone) operable to grind against the second surface 106 of the blade proximate the blade tip 108 to sharpen the blade 102 at and adjacent to the blade tip 108. The first and second grinding apparatuses 110, 112 are described in further detail below.

In the illustrated embodiment, a suitable motor (not shown) drives rotation of the blade 102. The first and second grinding wheels 114, 116 are capable of rotating freely (i.e., rotation of the first and second grinding wheels 114, 116 is not driven). Specifically, when the first and second grinding wheels 114, 116 are spaced from the respective first and second surfaces 104, 106 of the blade 102, the first and second grinding wheels 114, 116 do not rotate. However, when the first and second grinding wheels 114, 116 advance and contact the respective first and second surfaces 104, 106, the rotation of the blade 102, and the contact between the first and second grinding wheels 114, 116 and the first and second surfaces 104, 106 causes the first and second grinding wheels 114, 116 to rotate.

The sharpening of the blade 102 is controlled by the amount of pressure applied by the first and second grinding wheels 114, 116. Specifically, the more pressure applied by the first and second grinding wheels 114, 116 on the blade 102, the faster the first and second surfaces 104, 106 will wear. To keep the blade sharp 102, it is generally desirable to apply a substantially constant pressure by the first and second grinding wheels 114, 116 over time. The amount of pressure applied is controlled by advancing and retracting the first and second grinding wheels 114, 116 towards and away from the blade 102, as described herein.

Figure 2:
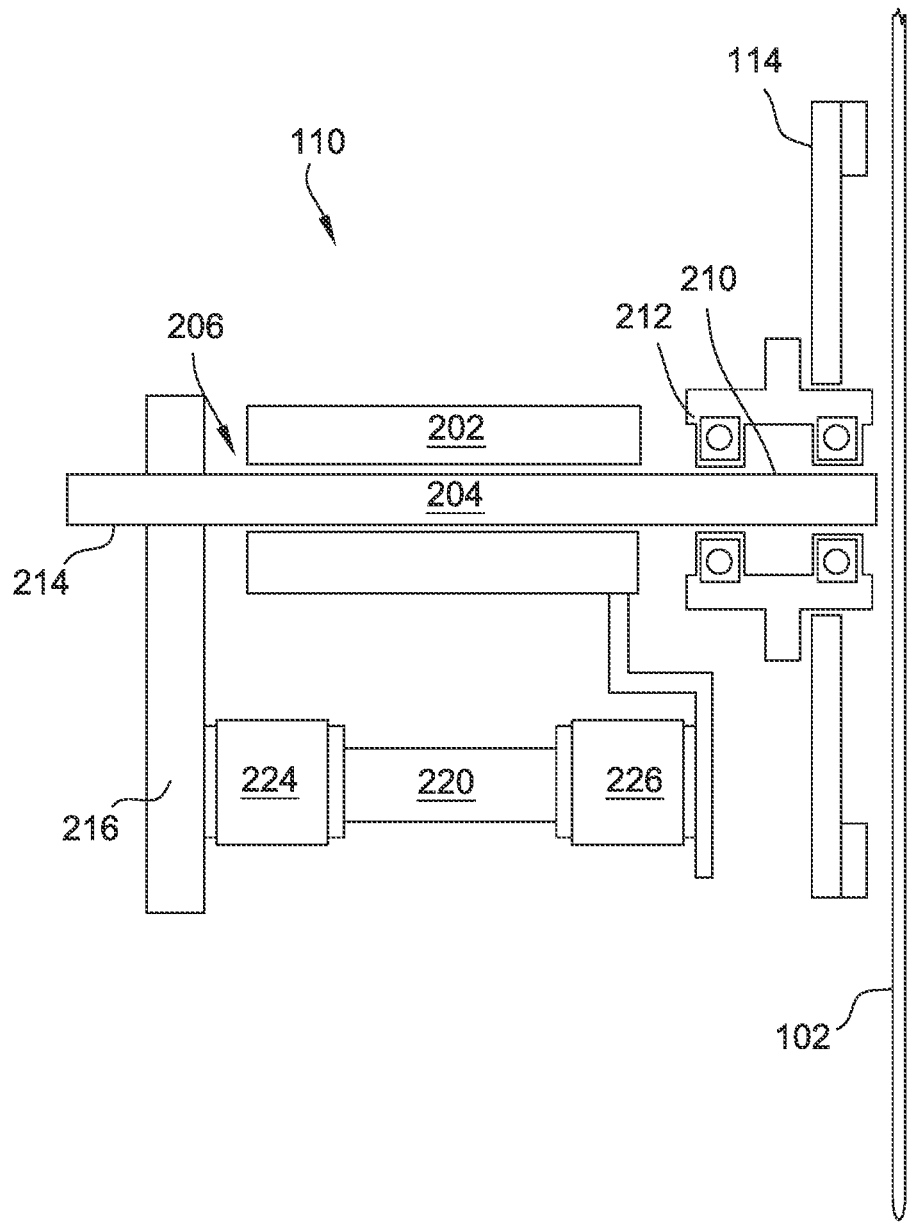
FIG. 2 is a schematic diagram of a first grinding apparatus that can be used with the blade sharpening system shown in FIG. 1.

FIG. 2 illustrates a schematic diagram of one suitable embodiment of the first grinding apparatus 110 and the blade 102. As shown in FIG. 2, the first grinding apparatus 110 includes a mounting block 202. Notably, in the illustrated embodiment, the blade 102 rotates relative to the mounting block 202, but the mounting block 202 is otherwise fixed with respect to the blade 102 (i.e., the mounting block 202 does not advance towards or retract away from the blade 102 during operation of the first grinding apparatus 110).

In the illustrated embodiment, a non-rotating shaft 204 extends through a channel 206 defined through the mounting block 202. The non-rotating shaft 204 is slidably coupled to the mounting block 202 (e.g., using a linear bearing (not shown)), such that non-rotating shaft 204 is capable of sliding along the channel 206 (i.e., towards and away from the blade 102).

A first end 210 of the non-rotating shaft 204 is rotatably coupled to the first grinding wheel 114 through a bearing assembly 212. Specifically, the bearing assembly 212 enables the first grinding wheel 114 to freely rotate (with the bearing assembly 212) about the non-rotating shaft 204. Further, a second end 214 of the non-rotating shaft is fixedly coupled to a connecting flag 216. In addition, a fluidic muscle 220 extends between the connecting flag 216 and a flange 222 of the mounting block 202.

Specifically, the fluidic muscle 220 includes a first end 224 fixedly coupled to the connecting flag 216, and a second end 226 fixedly coupled to the flange 222. In the illustrated embodiment, the fluidic muscle 220 is selectively transitionable between a relaxed state and an energized state. Specifically, when air pressure is applied to the fluidic muscle 220, the fluidic muscle 220 contracts from the relaxed state towards the energized state. For example, in one suitable embodiment, for every one psi of air pressure applied to the fluidic muscle 220, the fluidic muscle 220 contracts approximately 0.0012 inches (30.48 micrometers).

Selectively applying and removing air pressure to and from the fluidic muscle 220 enables controlling a position of the first grinding wheel 114 relative to the blade 102. For example, in FIG. 2, the fluidic muscle 220 is shown in the relaxed state. However, when air pressure is applied to the fluidic muscle 220, the fluidic muscle 220 contracts, causing the first end 224 of the fluidic muscle 220 to translate towards the second end 226 of the fluidic muscle 220. This, in turn, causes the connecting flag 216, the non-rotating shaft 204, the bearing assembly 212, and the first grinding wheel 114 to advance (i.e., translate) towards the blade 102 (the mounting block 202 remains stationary).

Accordingly, controlling the amount of air pressure applied to the fluidic muscle 220 facilitates controlling the pressure applied to the blade 102 by the first grinding wheel 114. Using a suitable electronic regulator, the amount of applied air pressure can be controlled to a high level of precision. For example, in some embodiments, the applied air pressure can be controlled such that the contraction of the fluidic muscle is adjustable in increments of approximately 0.0001 inches (2.54 microns).

The second grinding apparatus 112 operates generally similarly to the first grinding apparatus 110. However, in the illustrated embodiment, the mounting block 202 of the first grinding apparatus 110 is located on the same side of the blade 102 as the mounting block 202 of the second grinding apparatus 112, but the first and second grinding wheels 114, 116 are located on opposite sides of the blade 102. Accordingly, in the illustrated embodiment, the structure of the second grinding apparatus 112 is different from that of the first grinding apparatus 110.

Figure 3:
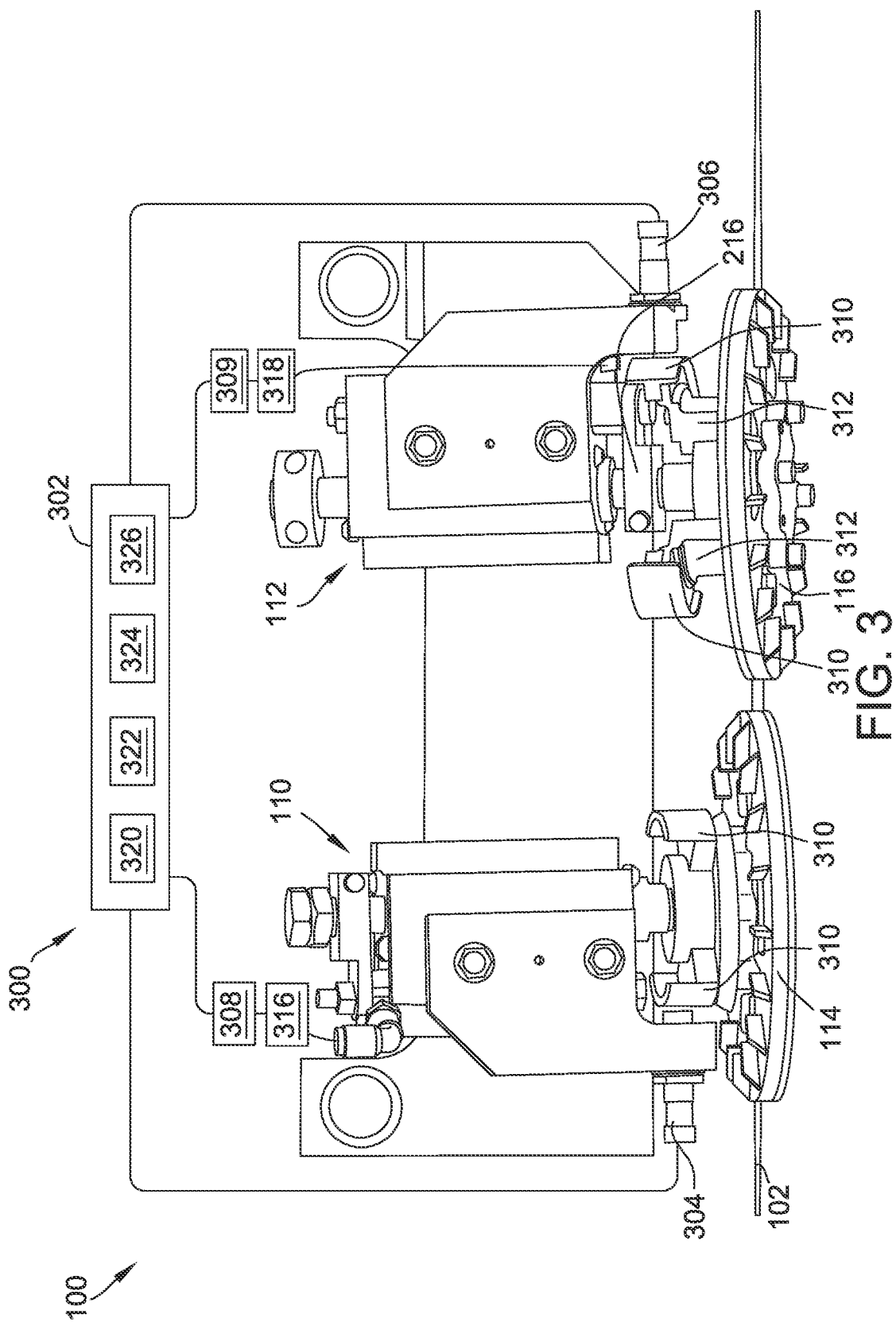
FIG. 3 is a schematic diagram of a control system that can be used with the blade sharpening system shown in FIG. 1.

Specifically, the connecting flag 216 of the second grinding apparatus 112 is positioned between the mounting block 202 and the second grinding wheel 116 (as best shown in FIG. 3). Accordingly, compression of the fluidic muscle 220 in the second grinding apparatus 112 causes the connecting flag 216 and the second grinding wheel 116 to translate towards the mounting block 202 (which results in the second grinding wheel 116 advancing towards the blade 102). Accordingly, in both the first and second grinding apparatuses 110, 112, applying air pressure to the fluidic muscle 220 causes the associated grinding wheel 114, 116 to advance towards the blade 102.

The systems and methods described herein provide a closed loop control system that facilitates controlling the amount of pressure applied by the first and second grinding wheels 114, 116 and the blade 102.

FIG. 3 illustrates one suitable embodiment of the blade sharpening system 100 that includes a control system, indicated generally at 300. The control system 300 comprises a controller 302, a first sensor 304, a second sensor 306, a first electronic regulator 308, and a second electronic regulator 309. The controller 302 is communicatively coupled to the first sensor 304, the second sensor 306, the first electronic regulator 308, and the second electronic regulator 309, and may be wired to or wirelessly connected to each of the first sensor 304, the second sensor 306, the first electronic regulator 308, and the second electronic regulator 309.

The first and second sensors 304, 306 detect a rotational speed of the first and second grinding wheels 114, 116, which corresponds to the pressure applied by the first and second grinding wheels 114, 116 on the blade 102. That is, the more pressure the first and second grinding wheels 114, 116 apply to the blade, the faster the first and second grinding wheels 114, 116 will rotate. As used herein, rotational speed refers to an angular speed (e.g., revolutions per minute (rpm)), as opposed to a linear speed.

In the illustrated embodiment, a pair of sensor flags 310 is coupled to the bearing assembly 212 of each of the first and second grinding apparatuses 110, 112. Specifically, in this embodiment, a first sensor flag 310 in the pair is positioned diametrically opposite a second sensor flag 310 in the pair (i.e., the sensor flags 310 are located on opposite sides of the non-rotating shaft 204). This keeps the associated grinding wheel 114, 116 balanced.

As shown in FIG. 3, in this embodiment, the sensor flags 310 of the first grinding apparatus 110 are coupled directly to the bearing assembly 212. In contrast, in the second grinding apparatus 112, the sensor flags 310 are coupled to the bearing assembly 212 through extension components 312 to prevent the sensor flags from contacting the connecting flag 216 during rotation.

Because they are attached to the bearing assembly 212, the sensor flags 310 rotate with the associated grinding wheel 114, 116. To detect the rotational speed of the first and second grinding wheels 114, 116, the first and second sensors 304 and 306 detect whenever a sensor flag 310 passes in front of them.

In one embodiment, the first and second sensors 304, 306 are metal detectors that electromagnetically detect the sensor flags 310. Alternatively, the first and second sensors 304, 306 may be any suitable sensing devices capable of detecting the sensor flags 310. For example, in some embodiments, the first and second sensors 304, 306 may be optical sensors. Further, in yet other embodiments, the sensor flags 310 may not be included, and the first and second sensors 304, 306 may detect rotation of the first and second grinding wheels 114, 116 by other means. Those of skill in the art will appreciate that any other suitable sensors and/or sensor flags may be used to monitor rotation of the first and second grinding wheels 114, 116.

The controller 302 receives signals from the first and second sensors 304, 306 and determines a rotational speed of each of the first and second grinding wheels 114, 116 based on the received signals.

In one suitable embodiment, the controller 302 comprises at least one memory device 320, a processor 322, a presentation interface 324, and a user input interface 326. The processor 322 is coupled to the memory device 320 for executing instructions. In some embodiments, executable instructions are stored in the memory device 320. In this embodiment, the controller 302 performs one or more operations described herein by programming the processor 322. For example, the processor 322 may be programmed by encoding an operation as one or more executable instructions and by providing the executable instructions in the memory device 320.

The processor 322 may include one or more processing units (e.g., in a multi-core configuration). Further, the processor 322 may be implemented using one or more heterogeneous processor systems in which a main processor is present with secondary processors on a single chip. In another illustrative example, the processor 322 may be a symmetric multi-processor system containing multiple processors of the same type. Further, the processor 322 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In one suitable embodiment, the memory device 320 is one or more devices that enable information such as executable instructions and/or other data to be stored and retrieved. The memory device 320 may include one or more computer readable media, such as, without limitation, dynamic random access memory (DRAM), static random access memory (SRAM), a solid state disk, and/or a hard disk. The memory device 320 may be configured to store, without limitation, application source code, application object code, source code portions of interest, object code portions of interest, configuration data, execution events and/or any other type of data.

The presentation interface 324 is coupled to the processor 322. The presentation interface 324 presents information to a user (e.g., an operator of the blade sharpening system 100). For example, the presentation interface 324 may include a display adapter (not shown) that may be coupled to a display device, such as a cathode ray tube, a liquid crystal display (LCD), an organic LED (OLED) display, and/or an "electronic ink" display. In some embodiments, the presentation interface 324 includes one or more display devices. Input signals and/or filtered signals processed using the embodiments described herein may be displayed on the presentation interface 324.

In one suitable embodiment, the user input interface 326 is coupled to the processor 322 and receives input from the user. The user input interface 326 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of the presentation interface 324 and the user input interface 326.

In some embodiments, a first solenoid valve 316 is coupled between the first electronic regulator 308 and the fluidic muscle 220 of the first grinding apparatus 110, and a second solenoid valve 318 is coupled between the second electronic regulator 309 and the fluidic muscle of the second grinding apparatus 112. The first and second solenoid valves 316, 318 may be controlled by the controller 302, and enable adjusting the amount of air pressure applied to the associated fluidic muscle 220 more quickly than embodiments not including the first and second solenoid valves 316, 318. This also reduces wear on the first and second electronic regulators 309, 310.

In one suitable embodiment, the controller 302 determines a rotational speed of each of the first and second grinding wheels 114, 116 by counting a number of rotations of the first and second grinding wheels 114, 116 over a predetermined period of time. For example, one rotation of the first grinding wheel 114 corresponds to the first sensor 304 detecting the passage of two sensor flags 310. Using signals from the first sensor 304, the controller 302 can calculate a number of rotations of the first grinding wheel 114 over a predetermined period of time, thus calculating a rotational speed of the first grinding wheel 114. Alternatively, the rotational speeds of the first and second grinding wheels 114, 116 may be calculated using any suitable technique.

In one suitable embodiment, the first and second grinding wheel 114, 116 are repeatedly advanced and retracted from the blade 102. For example, the first grinding wheel 114 may repeatedly alternate between grinding against the blade 102 for a first period of time (e.g., 5 seconds) and then retract from the blade for a second period of time (e.g., 12 seconds). In some embodiments, the first period of time and the second period of time are the same (e.g., 2 seconds each). Alternatively, the first and second time periods may have any suitable length.

In an embodiment where the first period of time is 5 seconds and the second period of time is 12 seconds, the predetermined period of time over which the number of rotations is calculated may be, for example, 17 seconds (i.e., representing one "cycle" for the grinding wheels 114, 116).

Further, in one suitable embodiment, for each grinding wheels 114, 116, a rotational speed is calculated for each of a plurality of cycles, and the plurality of rotational speeds calculated for that grinding wheel 114, 116 are averaged to calculate an average rotational speed. The average rotational speed may be used by the controller 302 to adjust operation of the first and second grinding apparatuses 110, 112, as described herein.

In the closed loop control system 300, the controller 302 controls the pressure applied by the first and second grinding wheels 114, 116 on the blade 102, based on the signals received from the first and second sensors 304, 306. Specifically, the controller 302 calculates rotational speeds for the first and second grinding wheels 114, 116, and controls the pressure applied based on the calculated rotational speeds.

As described above, the rotational speeds of the grinding wheels 114, 116 correspond to the pressure applied on the blade 102. That is, the more pressure applied on the blade 102 by a grinding wheel 114, 116, the faster the grinding wheel 114, 116 spins.

Accordingly, in one suitable embodiment, controller 302 calculates a rotational speed for the first grinding wheel 114, compares the rotational speed to a target rotational speed, and adjusts the pressure applied by the first grinding wheel 114 based on the comparison. The target rotational speed generally corresponds to a desired pressure applied by the first grinding wheel 114. That is, the calculated rotational speed should match the target rotational speed when the desired pressure is actually being applied by the first grinding wheel 114. In one example, the target rotational speed may be 10 rotations over a predetermined period of time.

In one example embodiment, the target rotational speed is a discrete value. Alternatively, the target rotational speed may be a range of values. Further, the target rotational speed may be stored in the memory device 320 and/or may be set by a user (e.g., using the user input interface 326). In addition, in some embodiments, the target rotational speed may be set based on the average rotational speed calculated from a plurality of previous cycles. For example, the target rotational speed may be the average rotational speed, or may be a range including the average rotational speed.

As indicated above, the controller 302 controls the pressure applied by the first grinding wheel 114 based on the comparison between the calculated rotational speed and the target rotational speed. Specifically, in one suitable embodiment, the controller 302 controls the first electronic regulator 308 to adjust the air pressure applied to the fluidic muscle 220 of the first grinding apparatus 110, which in turn adjusts a position of the first grinding wheel 114, which in turn adjusts the pressure applied by the first grinding wheel 114 on the blade 102. Generally, if the calculated rotational speed is less than the target rotational speed, the controller 302 controls the first electronic regulator 308 to advance the first grinding wheel 114 towards the blade 102, increasing the pressure. In contrast, if the calculated rotational speed is greater than the target rotational speed, the controller 302 controls the first electronic regulator 308 to retract the first grinding wheel 114 away from the blade 102, decreasing the pressure.

For example, in one embodiment, the controller 302 calculates an updated applied air pressure as:

$$updated\_pressure = avg\_pressure + gain * (calc\_speed - target\_speed)$$

where updated pressure is the updated applied air pressure, avg_pressure is the average air pressure previously applied over a predetermined period of time, gain is a predetermined multiplier, calc_speed is the calculated rotational speed, and target_speed is the target rotational speed. Accordingly, the applied air pressure may be adjusted using any suitable control algorithm.

In one suitable embodiment, the closed loop control system 300 herein facilitates applying a relatively constant pressure on the blade 102 by the first grinding wheel 114. This facilitates keeping the blade tip 108 sharp at all times, and mitigates issues that result from variations in applied pressure. Over time, the first grinding wheel 114 will gradually wear away the first surface 104 of the blade 102. Accordingly, to apply relatively constant pressure, in general, the first grinding wheel 11 will occasionally need to be advanced towards the blade 102 to compensate for surface of the blade 102 wearing away over time.

Further, in some embodiments, the fluidic muscle 220 may relax slightly (e.g., expand) over a period of time, even when the air pressure applied to the fluidic muscle 220 is constant. This may be referred to as 'fluidic muscle creep', and affects the position of the associated grinding wheel. However, using the closed loop control system 300 will generally account for and counteract any fluidic muscle creep.

The controller 302 controls the second grinding wheel 116 similarly (e.g., by comparing a calculated rotational speed of the second grinding wheel 116 to an associated target rotational speed, and by controlling, based on the comparison, the second electronic regulator 309 to adjust the pressure applied to the blade 102 by the second grinding wheel 116). In some embodiments, the target rotational speeds of the first and second grinding wheels 114 and 116 are different from one another. Further, the first and second grinding wheels 114, 116 will generally wear on the blade 102 at different rates. Accordingly, in at least some embodiments, it is desirable to control the position of the first and second grinding wheels 114, 116 independent of one another using the control system 300.

Figure 4:
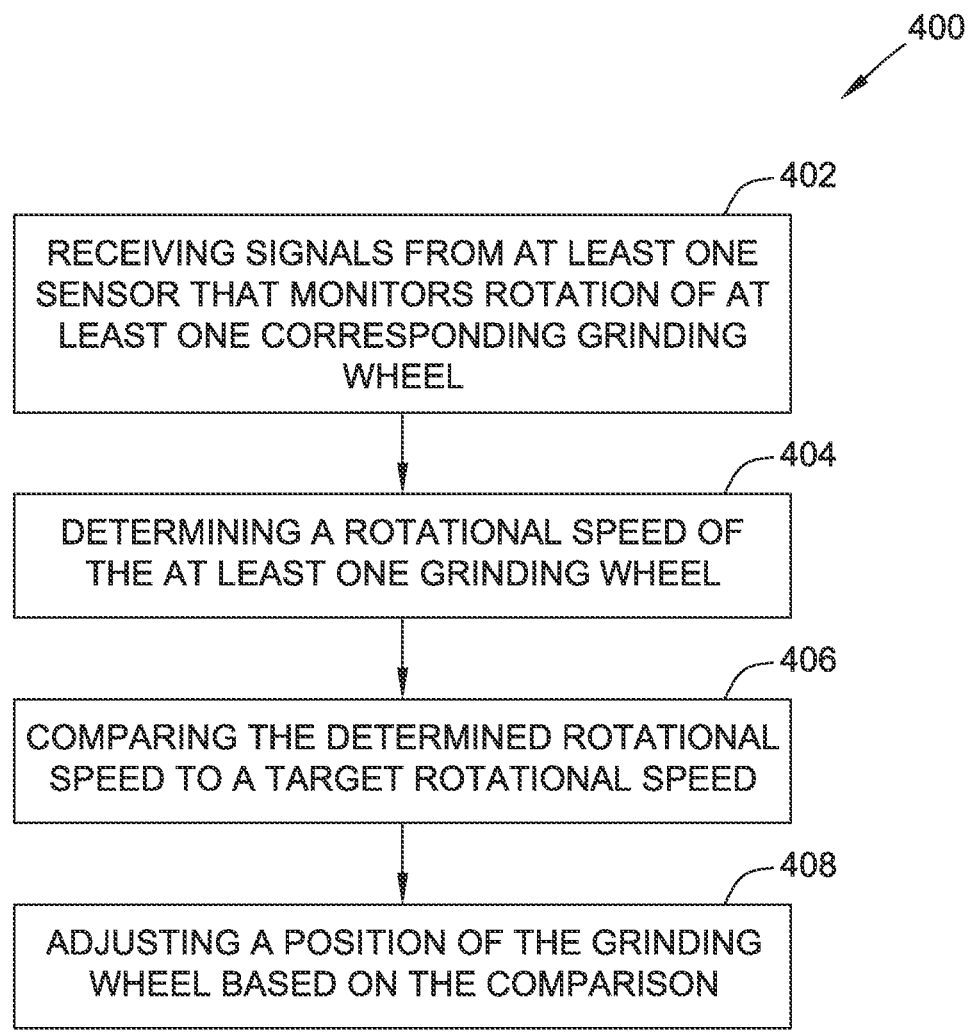
FIG. 4 is a flow diagram of a method for controlling a blade sharpening system according to one embodiment of the present disclosure.

FIG. 4 illustrates an example embodiment of a method 400 for controlling a blade sharpening system, such as the blade sharpening system 100. The method 400 may be implemented, for example, using controller 302 (shown in FIG. 3).

In this illustrated embodiment, the method 400 includes receiving 402, at a controller, signals from at least one sensor that monitors rotation of at least one corresponding grinding wheel. The at least one grinding wheel is operable to sharpen a blade.

The method 400 further includes determining 404, using the controller, based on the received signals, a rotational speed of the at least one grinding wheel. In addition, the method 400 includes comparing 406, using the controller, the determined rotational speed to a target rotational speed. Further, the method 400 includes adjusting 408, using the controller, a position of the at least one grinding wheel relative to the blade based on the comparison.

Figure 5:
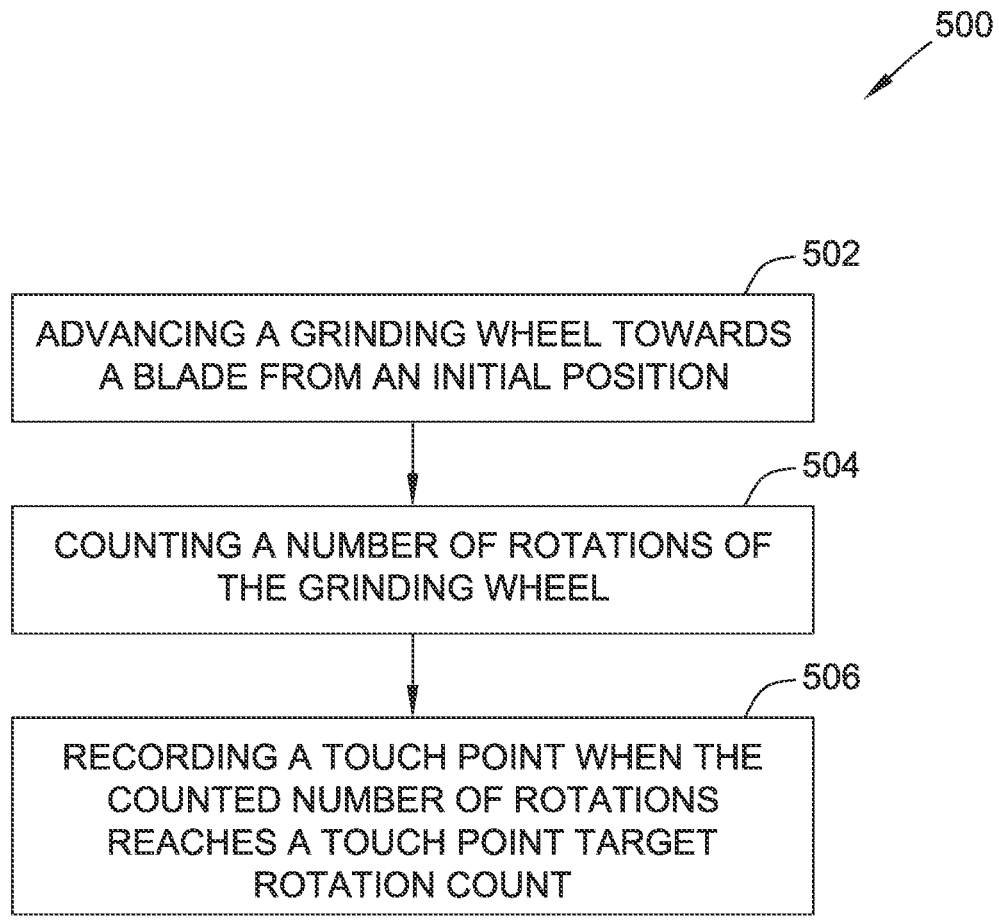
FIG. 5 is a flow diagram of a method for determining a touch point according to one embodiment of the present disclosure.

The embodiments described herein may also be used to detect a touch point for a grinding wheel (i.e., the point at which the grinding wheel initially contacts the blade). FIG. 5 illustrates an example embodiment of a method 500 for detecting a touch point. The method 500 may be implemented, for example, using controller 302 (shown in FIG. 3).

In the illustrated embodiment, the method 500 includes advancing 502 the grinding wheel towards the blade from an initial position. The initial position may correspond to, for example, an air pressure of 10 psi applied to the fluidic muscle associated with the grinding wheel.

To detect the touch point, the grinding wheel is advanced 502 towards the blade relatively slowly. For example, the air pressure applied to the fluidic muscle may be increased by 0.2 psi every 0.2 seconds. Prior to the grinding wheel contacting the blade, the grinding wheel will not rotate. However, once the grinding wheel contacts the blade, the grinding wheel will begin to rotate, causing a sensor (such as the first sensor 304) to detect passage of sensor flags (such as the sensor flags 310 on the first grinding wheel 114).

Accordingly, in the illustrated embodiment, while advancing 502 the grinding wheel, the controller counts 504 a number of rotations of the grinding wheel based on signals received from the sensor. For example, if the grinding wheel is coupled to two sensor flags located opposite one another (as shown in FIG. 2), two sensor flag detections correspond to one rotation of the grinding wheel.

When the counted 504 number of rotations reaches a touch point target rotation count, the controller records 506 the touch point (e.g., by recording the amount of air pressure applied to the fluidic muscle when the touch point target rotation count is reached). In one embodiment, the touch point target rotation count is one and a half rotations (corresponding to three sensor flag detections). Alternatively, the touch point target rotation count may be any suitable number of rotations. The grind cycle target rotation count may be set by a user (e.g., by providing user input to the controller) or may be set automatically by the controller. Notably, establishing a touch point using the method 500 is more accurate than a user attempting to manually determine the touch point, as it removes the possibility of human error.

In some embodiments, the controller generates an alert if the touch point is detected below a lower threshold pressure value or above a higher threshold pressure value. That is, based on the arrangement of the grinding wheel and the blade, the touch point should be detected within an expected range of applied air pressures, the expected range defined by the lower and higher threshold pressures values. If the touch point is detected outside of the expected range, it is likely that the system was set up improperly, or that the system is malfunctioning. Accordingly, in such situations, the controller generates an alert. The alert may be, for example, an audio or visual alert. Further, the alert may include shutting down the system to prevent damage to the system.

Figure 6:
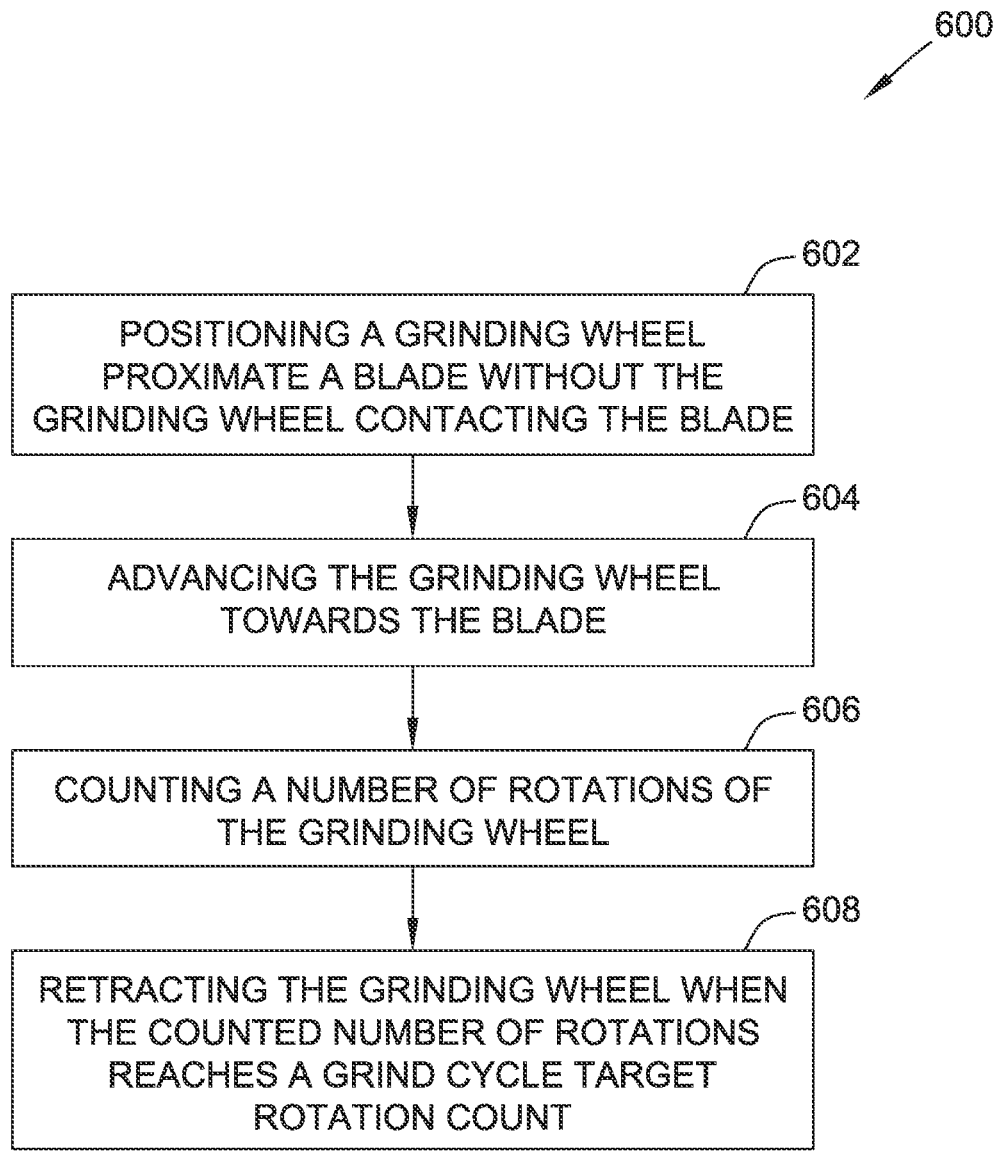
FIG. 6 is a flow diagram of an alternative method for controlling a blade sharpening system according to one embodiment of the present disclosure.

FIG. 6 illustrates an example embodiment of an alternative method 600 for controlling a blade sharpening system, such as the blade sharpening system 100. The method 600 may be implemented, for example, using controller 302 (shown in FIG. 3).

In contrast to method 400, method 600 does not include determining a rotational speed, comparing the determined rotational speed to a target rotational speed, and adjusting the grinding wheel based on that comparison. Rather, as explained below, method 600 includes detecting a number of rotations of the grinding wheel as the grinding wheel is advanced towards the blade, and retracting the grinding wheel when a target number of rotations is reached. Accordingly, in method 600, the grinding wheel is controlled proactively to reach a desired number of rotations each grinding cycle. In contrast, in method 400, the grinding wheel is controlled reactively, with the grinding wheel being adjusted at the end of one cycle to improve performance for the next cycle.

In the illustrated embodiment, the method 600 includes positioning 602, using a controller, the grinding wheel proximate the blade without the grinding wheel contacting the blade. For example, to position 602 the grinding wheel, an air pressure slightly less than the air pressure corresponding to a previously determined touch point (e.g., determined using the method 500) may be applied to the fluidic muscle coupled to the grinding wheel. For example, an air pressure that is 3 psi less than the air pressure corresponding to the touch point may be applied.

Further, the method 600 includes advancing 604 the grinding wheel towards the blade. For example, the grinding wheel may be advanced 604 by increasing the applied air pressure by 0.2 psi every 0.5 seconds. Alternatively, the grinding wheel may be advanced 604 at any suitable rate.

Once the grinding wheel contacts the blade, the grinding wheel will begin to rotate, causing a sensor (such as the first sensor 304) to detect passage of sensor flags (such as the sensor flags 310 on the first grinding wheel 114).

Accordingly, in the illustrated embodiment, while advancing 604 the grinding wheel, the controller counts 606 a number of rotations of the grinding wheel based on signals received from the sensor. For example, if the grinding wheel is coupled to two sensor flags located opposite one another (as shown in FIG. 2), two sensor flag detections correspond to one rotation of the grinding wheel.

When the counted 606 number of rotations reaches a grind cycle target rotation count, the controller retracts 608 the grinding wheel from the blade (i.e., ending the grind cycle). In one embodiment, the grind cycle target rotation count is ten rotations (corresponding to twenty sensor flag detections). Alternatively, the grind cycle target rotation count may be any suitable number of rotations. The grind cycle target rotation count may be set by a user (e.g., by providing user input to the controller) or may be set automatically by the controller.

Notably, during performance of the method 600, the controller may also record an updated touch point when the counted 606 number of rotations reaches a touch point target rotation count (similar to the method 500). The updated touch point can then be used to set the initial position of the grinding wheel for the next grind cycle.

In some embodiments, the controller 302 generates one or more alerts based on the signals received from the first and second sensors 304, 306. For example, the controller 302 may generate an alert as described above in relation to the method 500. Further, in one embodiment, the controller 302 may generate a touch point drift alert when the difference between touch points determined for subsequent grind cycles exceeds a threshold (e.g., indicating failure or malfunction of the system). In another embodiment, the controller 302 may generate an alert if the applied air pressure exceeds a threshold pressure value without detecting any rotation of the grinding wheel. In yet another embodiment, the controller 302 may generate an alert if the calculated rotational speed exceeds a maximum rotational speed value (e.g., indicating that the grinding wheel is spinning too quickly). In another embodiment, an alert may be generated when the controller 302 determines that at least one of the first and second sensors 304, 306 has failed.

Those of skill in the art will appreciate that other suitable alerts may be generated by the controller 302. Each alert may include an audio alert, a visual alert, and/or shutting down the system (e.g., stopping rotation of the blade).

The embodiments described herein provide a closed-loop control system that improves blade sharpening over existing sharpening systems. For example, using the systems and methods described herein, blade sharpness may be improved, blade rotation speed may be reduced, blade maintenance may be reduced, blade lifetime may be extended, and grinding stone lifetime may be extended, among other advantages.

The control system receives signals from a sensor operable to monitor rotation of the grinding wheel. The control system adjusts a position of the grinding wheel relative to the blade based on the received signals. By dynamically adjusting the position of the grinding wheel based on the sensor signals, the control provides a closed loop feedback system that improves sharpening of the blade, and provides other advantages over at least some known blade sharpening systems.

When introducing elements of the present invention or the preferred embodiment(s) thereof, the articles "a", "an", "the", and "said" are intended to mean that there are one or more of the elements. The terms "comprising," "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A controller for use in controlling a blade sharpening system that includes at least one grinding wheel operable to sharpen a blade, the controller comprising:
   a memory device; and
   a processor communicatively coupled to the memory device, the processor configured to:
   control the at least one grinding wheel to move into contact with the blade, while the blade is being rotated, to impart rotational movement to the at least one grinding wheel;
   receive signals from at least one sensor, the at least one sensor operable to monitor rotation of the at least one grinding wheel; and
   adjust a position of the at least one grinding wheel relative to the blade based on the received signals, wherein to adjust the position of the least one grinding wheel, the processor is configured to:
   count a number of rotations of the at least one grinding wheel based on the received signals; and
   retract the at least one grinding wheel from the blade when the counted number of rotations reaches a grind cycle rotation count.

2. The controller set forth in claim 1, wherein to adjust the position of the at least one grinding wheel, the processor is configured to:
   determine, based on the received signals, a rotational speed of the at least one grinding wheel; and
   compare the determined rotational speed to a target rotational speed.

3. The controller set forth in claim 1, wherein to adjust the position of the at least one grinding wheel, the processor is configured to adjust the position of the at least one grinding wheel to maintain a substantially constant applied pressure on the blade by the at least one grinding wheel.

4. The controller set forth in claim 1, wherein to adjust the position of the at least one grinding wheel, the processor is configured to control an electronic regulator to adjust an amount of air pressure applied to a fluidic muscle that controls the position of the at least one grinding wheel.

5. The controller set forth in claim 1, wherein to receive signals from the at least one sensor, the processor is configured to:
   receive signals from a first sensor operable to monitor rotation of a first grinding wheel that sharpens a first surface of the blade; and
   receive signals from a second sensor operable to monitor rotation of a second grinding wheel that sharpens a second, opposite surface of the blade.

6. The controller set forth in claim 1, wherein to receive signals from the at least one sensor, the processor is configured to receive signals from at least one metal detector operable to detect at least one sensor flag that rotates with the at least one grinding wheel.

7. A controller for use in controlling a blade sharpening system that includes at least one grinding wheel operable to sharpen a blade, the controller comprising:
   a memory device; and
   a processor communicatively coupled to the memory device, the processor configured to:
   receive signals from at least one sensor, the at least one sensor operable to monitor rotation of the at least one grinding wheel; and
   adjust a position of the at least one grinding wheel relative to the blade based on the received signals, wherein to adjust the position of the at least one grinding wheel, the processor is configured to:
   position the at least one grinding wheel proximate the blade without contacting the blade;
   advance the at least one grinding wheel towards the blade;
   count a number of rotations of the at least one grinding wheel based on the received signals; and
   retract the at least one grinding wheel from the blade when the counted number of rotations reaches a grind cycle target rotation count.

8. The control system set forth in claim 7, wherein to adjust the position of the at least one grinding wheel, the processor is configured to:
   determine, based on the received signals, a rotational speed of the at least one grinding wheel; and
   compare the determined rotational speed to a target rotational speed.

9. The control system set forth in claim 7, wherein to adjust the position of the at least one grinding wheel, the processor is configured to adjust the position of the at least one grinding wheel to maintain a substantially constant applied pressure on the blade by the at least one grinding wheel.

10. The control system set forth in claim 7, wherein to adjust the position of the at least one grinding wheel, the processor is configured to control an electronic regulator to adjust an amount of air pressure applied to a fluidic muscle that controls the position of the at least one grinding wheel.

11. The control system set forth in claim 7, wherein to receive signals from the at least one sensor, the processor is configured to:
   receive signals from a first sensor operable to monitor rotation of a first grinding wheel that sharpens a first surface of the blade; and receive signals from a second sensor operable to monitor rotation of a second grinding wheel that sharpens a second, opposite surface of the blade.

12. The control system set forth in claim 7, wherein to receive signals from the at least one sensor, the processor is configured to receive signals from at least one metal detector operable to detect at least one sensor flag that rotates with the at least one grinding wheel.

* * * * *